US008694687B2

(12) United States Patent
Hammouri et al.

(10) Patent No.: US 8,694,687 B2
(45) Date of Patent: Apr. 8, 2014

(54) COMPUTING-SYSTEM IDENTIFIER USING SOFTWARE EXTRACTION OF MANUFACTURING VARIABILITY

(75) Inventors: Ghaith M. Hammouri, Worcester, MA (US); Berk Sunar, Boylston, MA (US); Cetin Kaya Koc, Santa Barbara, CA (US); Kahraman D. Akdemir, Franklin, MA (US)

(73) Assignee: Intryca, Inc., Santa Barbara, CA (US)

( * ) Notice: Subject to any disclaimer, the term of this patent is extended or adjusted under 35 U.S.C. 154(b) by 90 days.

(21) Appl. No.: 12/838,021

(22) Filed: Jul. 16, 2010

(65) Prior Publication Data
US 2012/0011704 A1   Jan. 19, 2012

(51) Int. Cl.
*G06F 3/00* (2006.01)

(52) U.S. Cl.
USPC .......................................................... 710/3

(58) Field of Classification Search
USPC .......................................................... 710/3
See application file for complete search history.

(56) References Cited

U.S. PATENT DOCUMENTS

| 7,291,507 B2 | 11/2007 | Bidermann |
| 7,432,485 B2 | 10/2008 | Stallinga |
| 7,554,337 B2 | 6/2009 | Tuyls |
| 7,564,345 B2 | 7/2009 | Devadas |
| 7,602,935 B2 * | 10/2009 | Nishino .......................... 382/100 |
| 7,616,237 B2 | 11/2009 | Fridrich |
| 7,681,103 B2 | 3/2010 | Devadas |
| 7,702,927 B2 | 4/2010 | Devadas |
| 2001/0033683 A1 * | 10/2001 | Tanaka et al. .................. 382/149 |
| 2003/0133576 A1 | 7/2003 | Grumiaux |
| 2003/0204743 A1 | 10/2003 | Devadas |
| 2004/0120545 A1 * | 6/2004 | Nishino .......................... 382/100 |
| 2006/0271792 A1 | 11/2006 | Devadas |
| 2007/0044139 A1 | 2/2007 | Tuyls |
| 2007/0091376 A1 * | 4/2007 | Calhoon et al. ............... 358/3.28 |
| 2008/0229119 A1 | 9/2008 | Skoric |
| 2008/0256600 A1 | 10/2008 | Schrijen |
| 2009/0083833 A1 | 3/2009 | Ziola |
| 2009/0222672 A1 | 9/2009 | Clarke |
| 2009/0265758 A1 | 10/2009 | Tuyls |
| 2011/0255793 A1 * | 10/2011 | Neumann et al. .............. 382/201 |

OTHER PUBLICATIONS

Dodis, Ostrovsky, Reyzin, Smith; Fuzzy Extractors: How to Generate Strong Keys from Biometrics and Other Noisy Data; SIAM J. Comput. 38(1): 97-139 (2008).
Hammouri, Dana, Sunar; CDs Have Fingerprints Too, CHES 2009: 348-362.
Kivanc Mihcak, Kozintsev, Ramchandran, Spatially Adaptive Statistical Modeling of Wavelet Image Coefficients and Its Application to Denoising, Proceedings, IEEE International Conference on Acoustics, Speech, and Signal Processing, 1999, vol. 6.

(Continued)

Primary Examiner — Chun-Kuan Lee
(74) Attorney, Agent, or Firm — Kilpatrick Townsend & Stockton LLP

(57) ABSTRACT

A system for generating a computing system specific value comprising, a computing system not comprising any specialized hardware to generate a device specific value, a software product tangibly embodied in a machine-readable medium, comprising instructions operable to cause computing system to perform operations comprising: generating a digital value which is substantially dependent on manufacturing variation among like devices of computing system.

25 Claims, 11 Drawing Sheets

(56) References Cited

OTHER PUBLICATIONS

Lukáš, Fridrich, and Goljan: Digital Camera Identification from Sensor Pattern Noise. IEEE Transactions on Information Security and Forensics, vol. 1(2), pp. 205-214, Jun. 2006.

Gassend, Lim, Clarke, van Dijk, Devadas: Identification and authentication of integrated circuits. Concurrency—Practice and Experience 16(11): 1077-1098 (2004).

Holcomb, Burleson, and Fu,: Power-Up SRAM State as an Identifying Fingerprint and Source of True Random Numbers. IEEE Trans. Comput. 58,9 (Sep. 2009).

DeJean, Kirovski,: RF-DNA: Radio-Frequency Certificates of Authenticity. In: Paillier, P., Verbauwhede, I. (eds.) CHES 2007. LNCS, vol. 4727, pp. 346-363.Springer, Heidelberg (2007).

Clarkson, Weyrich, Finkelstein, Heninger, Halderman, Felten: Fingerprinting Blank Paper Using Commodity Scanners. In: Proceedings of S&P 2009, Oakland, CA, May 2009. IEEE Computer Society, Los Alamitos.

Lim, Lee, Gassend, Suh, van Dijk, Devadas,: Extracting Secret Keys From Integrated Circuits. IEEE Transactions on VLSI Systems 13(10), 1200-1205 (2005).

Bösch, Guajardo, Sadeghi, Shokrollahi, and Tuyls: Efficient Helper Data Key Extractor on FPGAs. CHES 2008, LNCS 5154, pp. 181-197, 2008.

Goljan, Fridrich, and Filler,: Large Scale Test of Sensor Fingerprint Camera Identification, Proc. SPIE, Electronic Imaging, Media Forensics and Security XI, San Jose, CA, Jan. 18-22, 2009, pp. 0I 1-0I 12.

Chen, Fridrich, Goljan, and Lukáš,: "Determining Image Origin and Integrity Using Sensor Noise," IEEE Transactions on Information Security and Forensics, vol. 3(1), pp. 74-90, Mar. 2008.

Fridrich,:"Digital Image Forensics Using Sensor Noise." IEEE Signal Processing Magazine, vol. 26, No. 2, Mar. 2009, pp. 26-37.

* cited by examiner

Figure 8

| N | 5 | 10 | 15 | 20 | 25 | 30 | 35 | 40 | 45 | 50 |
|---|---|---|---|---|---|---|---|---|---|---|
| Noise | 0.27 | 0.18 | 0.13 | 0.10 | 0.08 | 0.07 | 0.06 | 0.05 | 0.05 | 0.04 |
| Distance | 0.50 | 0.48 | 0.47 | 0.47 | 0.46 | 0.47 | 0.47 | 0.47 | 0.46 | 0.46 |

Figure 9

| N | 5 | 10 | 15 | 20 | 25 | 30 | 35 | 40 | 45 | 50 |
|---|---|---|---|---|---|---|---|---|---|---|
| Noise | 0.04 | 0.01 | 0.01 | 0.00 | 0.00 | 0.00 | 0.00 | 0.00 | 0.00 | 0.00 |
| Distance | 0.17 | 0.16 | 0.16 | 0.16 | 0.16 | 0.16 | 0.16 | 0.16 | 0.16 | 0.16 |

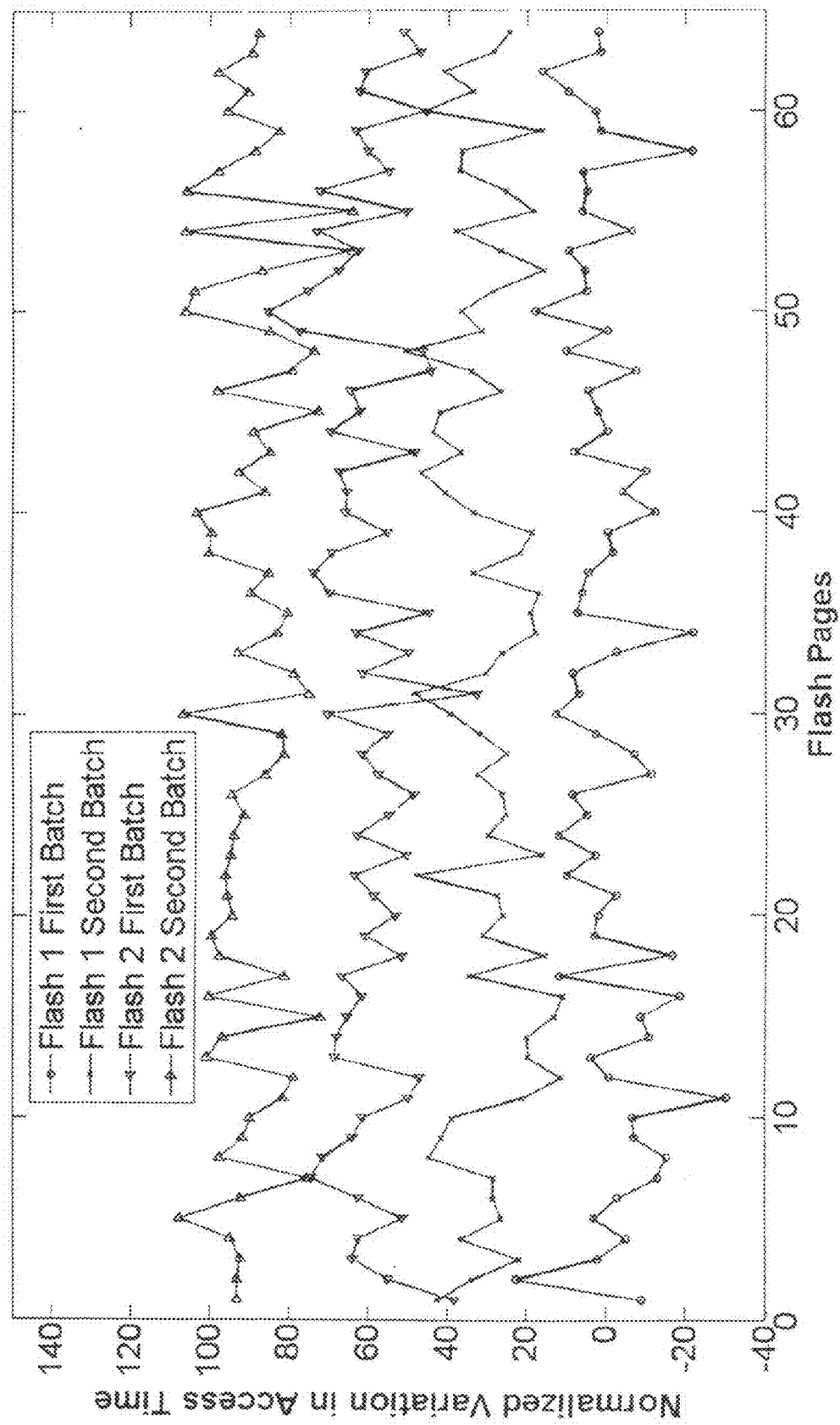

COMPUTING-SYSTEM IDENTIFIER USING SOFTWARE EXTRACTION OF MANUFACTURING VARIABILITY

REFERENCE TO RELATED APPLICATION

This application is related to U.S. patent application Ser. No. 12/838,253, entitled Mobile Phone Aided Cryptographic Operations System and Method, filed Jul. 16, 2010, herewith. That application is incorporated herein by reference.

BACKGROUND

Computers and digital devices (for example, cellular phones, laptops, mp3 players, and the like), collectively "computing systems", are becoming an essential part of today's world. Many people find it hard to go anywhere without having their personal digital devices. In the past few years advancements in digital technology have transferred various digital devices from simple single task gadgets into a complete computing platform. As more and more people use different digital devices to access and process sensitive information such as bank accounts, health records, and the like, it becomes vital to uniquely identify the devices used to access this sensitive information in order to enforce secure access policies.

Due to the physical nature of computing systems, the laws of physics ensure that these systems will have differences in their physical structure even when they are built to be identical. This phenomenon is referred to as "manufacturing variability" and is a major source of concern for manufacturers striving to produce identical devices.

A large number of physical devices have been shown to contain some type of a fingerprint, used to distinguish one physical device from another. Examples of such devices are digital circuits, CDs, and regular writing paper. In general, prior art fingerprinting techniques take advantage of the manufacturing variability left during the manufacturing process. However, it is now understood that no manufacturing process produces 100% identical devices, even when these devices are extremely small and sit right next to each other in the manufacturing space.

In accordance with the present system and method, the inherent manufacturing variability of components is used to extract unique identifiers (sometimes referred to herein as "fingerprints") for individual computing systems. Utilizing the manufacturing variability, identifying strings are determined which can aid various cryptographic operations. The identifying strings are determined pursuant to a software- (or firmware-) controlled operation of the computer system, without changing or adding anything to the pre-existing hardware structure of the computing system. Using this approach, the software and, more particularly, the method performed by the operational steps controlled by the software, detects and processes the manufacturing variability without manipulating the hardware or changing the original design of the computing, but rather by running special software that can extract and utilize the manufacturing variability for identification purposes using the information naturally available to an operating system running on a computing system.

Using such an approach represents substantial advancement over prior art attempts to generate fingerprints, which attempts require changes to the hardware of the computing systems or even changes to the data which is collected from the hardware. In the prior art, such changes include adding new chips to the computing system, changing the design of the used chips, adding an external specialized device to aid with the extraction of a unique identifier, or even requiring the hardware to perform measurements which typically are not provided to an operating system. In contrast, the present method does not require any change to the hardware of a standard computing system, that is, one which has not been equipped with special hardware to extract device-specific strings. Instead, for computing systems, all that is required to extract these computing system-specific identifiers, is an installation of specialized software carrying out steps in accordance with the method described herein. Moreover, by applying the present extraction techniques described herein, unique identifiers are extracted which enjoy noise-free qualities with high entropy, thus enabling direct usage of extracted values in cryptographic protocols and security applications.

SUMMARY

This present system and method can utilize many of the hardware modules that typically are found in computing systems, e.g., digital camera, microphone, flash memory, network card, display devices, and the like.

The term "fingerprint" typically is used to associate a unique value with a particular object. Just like a human fingerprint is expected to uniquely identify a particular individual, a fingerprint of any physical object is expected be used to uniquely identify that object. For a measurement or a value to be a fingerprint of a device it needs to satisfy two main conditions. First, the value or measurement needs to be reproducible with a low noise level. Every time the fingerprint is extracted from an object its value should be "close" to the value of the fingerprint when extracted at a different time. Second, the fingerprint value for some system should be "far" from the fingerprint value obtained from all other objects.

As used herein, the terms "close" and "far" are used to indicate distance under some distance metric. As an example one can think of the Hamming distance, which typically is used to measure the "distance" between two binary strings. When values satisfy these properties they can be called fingerprints. Therefore, these values can be used for tracing the origin of an output or for distinguishing objects from other objects previously identified. However, this alone will not provide a true computing system-specific identifier useful in security applications. A truly useful identifier has to be completely free of noise so that it can be processed or inputted to cryptographic or mathematical operations with the expectation that the output would come out equal when used on the same device. In such scenarios, even a single bit or value of error would result in massive differences in the output of used mathematical operations. Moreover, for a computing system identifier to result in true identification and security, a large amount of entropy needs to be extracted from the original fingerprint. To achieve these properties, a fingerprint has to be subjected to various extraction techniques some of which have been studied in the literature (for example, see Yevgeniy Dodis, Rafail Ostrovsky, Leonid Reyzin, Adam Smith: *Fuzzy Extractors: How to Generate Strong Keys from Biometrics and Other Noisy Data*, SIAM J. Comput. 38(1): 97-139 (2008); and Ghaith Hammouri, Aykutlu Dana, Berk Sunar: *CDs Have Fingerprints Too*, CHES 2009: 348-362.)

The present system and method includes a kit for generating an identifier for a computing system. The kit includes: (i) a computing system, having at least one component and including a processor and an operating system resident thereon; (2) a computer program embodied in a machine-readable medium, and adapted to be run by the operating system on the computing system. The program includes instructions which, when run by the operating system, generate a digital identifier value. The digital identifier value is substantially representative of a manufacturing variation of at least one component of the computing system relative to like-manufactured components. In an embodiment of the kit where the computing system includes a computer and an associated memory, the memory is the component for which the digital identifier is generated, and the digital identifier value is representative of manufacturing variation-based variations of a measured stored information retrieval time associated with the memory.

The computing system may be: (i) a computer, including at least one integrated circuit (wherein the integrated circuit is the component); (ii) a telephone, including at least one integrated circuit, (wherein the integrated circuit is the component); (iii) a camera, including at least one integrated circuit (wherein the integrated circuit is the component); (iv) a camera and an associated image sensor (wherein the image sensor is the component); (v) an audio device and an associated microphone, (wherein the microphone is the component); (vi) an audio device of a computer and an associated microphone, (wherein the microphone is the component); (vii) a computer and an associated display, (wherein the display is the component); (viii) a computer and an associated internal memory, (wherein the memory is the component); or (ix) a computer and an associated external flash memory, (wherein the flash memory is the component).

The kit may further include a coupler for selectively loading the computer program onto the computing system. In such an embodiment, the coupler is selectively operable to obtain the computer program by way of the internet, for loading onto the computing system.

In an embodiment, the program includes instructions which when run by the operating system, perform further operations, such as processing the digital identifier value to generate redundancy information therefrom, or generating an identity string from the digital identifier value and the redundancy information, wherein the identity string is representative of the identity of the computing system. In an embodiment, the identity string is a privacy amplified version of a digital identity value. In alternate embodiments, the generation of the digital identifier value is pursuant to at least one: (i) noise reduction step; (ii) de-noising filtering step; or (iii) post-processing step. In an embodiment, the redundancy information is a result of an error checking and correction method. The generation of the identity string may be pursuant to at least one fuzzy extraction processing step.

The present system further includes computer program embodied in a machine-readable medium, and adapted to be run on a computing system, wherein the program includes instructions which, when run by the operating system, generate a digital identifier value. The digital identifier value is substantially representative of a manufacturing variation of at least one component of the computing system relative to like-manufactured components. In an embodiment, the program provides further instructions which, when run by the operating system, process the digital identifier value to generate redundancy information therefrom, and generate an identity string from the digital identifier value and the redundancy information. In such an embodiment, the identity string is representative of the identity of the computing system.

In one embodiment, the generation of the digital identifier value is pursuant to at least one: (i) noise reduction step; (ii) de-noising filtering step; or (iii) post-processing step. In an embodiment, the computer program generates the redundancy information pursuant to an error checking and correction method. The generation of the identity string is pursuant to at least one fuzzy extraction processing step, and may be a privacy-amplified version of digital identity value.

The present method, which is performed on a computing system in response to a computer program, includes the step of generating a digital identifier value associated with the computing system, which digital identifier value is substantially representative of a manufacturing variation of at least one component of the computing system relative to like-manufactured components.

An embodiment of the present method includes the further steps of: (i) processing the digital identifier value to generate redundancy information therefrom; and (ii) generating an identity string from the digital identifier value and the redundancy information, wherein the identity string is representative of the identity of the computing system. In alternate embodiments, the step of generating the digital identifier value includes at least one: (a) noise reduction substep; (b) de-noising filtering substep; or (c) post-processing substep.

In an embodiment, the step of generating the redundancy information includes at least one error checking and correction substep. The step of generating the identity string includes at least one: (i) fuzzy extraction processing substep; or (ii) privacy amplifying substep.

DESCRIPTION OF DRAWINGS

FIG. 8 is a table for the noise level and the distance given when N images are used in the extraction process of the fingerprint.

FIG. 9 is a table for the noise level and the distance given when N images are used in the extraction process of the fingerprint.

FIG. 12 is a graph of a fingerprint extracted from two flash memory devices.

DESCRIPTION

Computer and other digital devices (especially user-interactive devices), collectively referred to herein as "computing systems", contain a number of different hardware modules which interact with the surrounding environment in order to produce data which can be utilized by the computing system and its users. By way of example, a digital device, such as a cellular phone, contains various hardware modules, such as a microphone, a speaker, a digital camera, a network card, a Bluetooth card, a flash memory chip, and the like. While all of these modules are part of a cellular phone, each of them performs an independent task and has a different physical structure.

When a large number of digital devices are manufactured, they typically utilize identical hardware modules inside of them. The term "identical" here means performing the same logical operation, physically looking the same (macroscopically), and manufactured using the same process. However, as the basic laws of physics will tell us, it is impossible for these chips to truly be identical. In fact, these "identical" chips typically are quite different, to the point where the properties of their produced output at some level also will undergo different transforms in a way that it becomes possible to determine the identity of a specific chip which performs an operation, by simply analyzing the output of the chip.

This phenomenon of having hardware modules (chips) which are meant to be identical, but which end up presenting slightly different behavior is known as manufacturing variability (MV). Today it is well understood that MV is a natural consequence of the manufacturing process used in producing these modules. Due to the effects of MV on the performance of the hardware module, many efforts have been directed towards minimizing MV. However, it is becoming clear that this phenomenon can never be totally eliminated, but can only be minimized to a certain level. While this might be bad news for manufacturers, it is certainly good news for security applications.

The methods and systems described herein treat all hardware modules the same. For example, when distinct integrated circuit chips are referred to as "different" herein, it should be understood that the "different" chips are different realizations of the same hardware module. That is, the "different" chips are of the same type, and made by the same manufacturing process, and thus are "identical" from the manufacturer's perspective.

Figure 1:
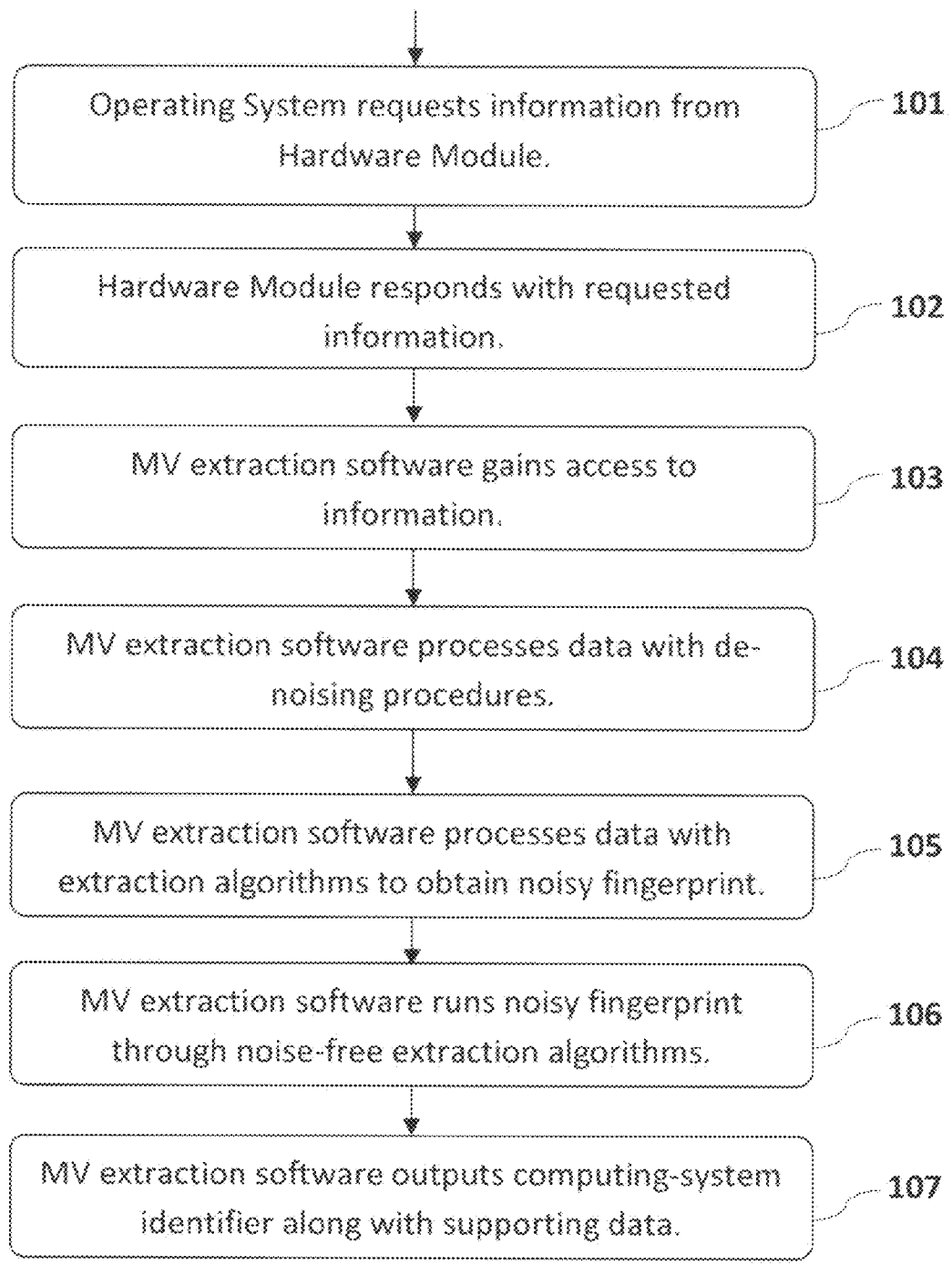
FIG. 1 is a flow chart showing the general flow of processing in accordance with the present system and method.

Turning now to the specific embodiments of the present system and method, FIG. 1 is a flow chart showing the general flow of processing in accordance with the present system and method. Initially, an operating system running on a target computing system requests information from the hardware module 101. The hardware module may be any target hardware device that is to be authenticated, and which produces an output signal, such as a microphone, camera, memory device, speakers, and the like. The information requested by the operating system can be anything which the hardware module is normally capable of providing, such as, sound from a microphone, images from a camera, data from memory, and the like.

The hardware module then returns the requested data 102 to the requesting computer. Once the requested data is received by the operating system, the manufacturing variability (MV) extraction software can access this information 103. Note that the MV extraction software can make the initial request for information if the operating system allows the MV extraction software to gain control over the hardware module.

Once the MV extraction software gains control over the hardware module, it can then process the obtained data 104 with de-noising procedures, which procedures are generally known by those skilled in the relevant art, and which are discussed in further detail below. The MV extraction software can then process the data 105 with extraction algorithms to produce a noisy fingerprint of the computing system. The noisy fingerprint can then be processed by noise-free extraction algorithms 106 to produce computing system identifier along with supporting data 107 which can aid the regeneration of the computing system identifier.

Figure 2:
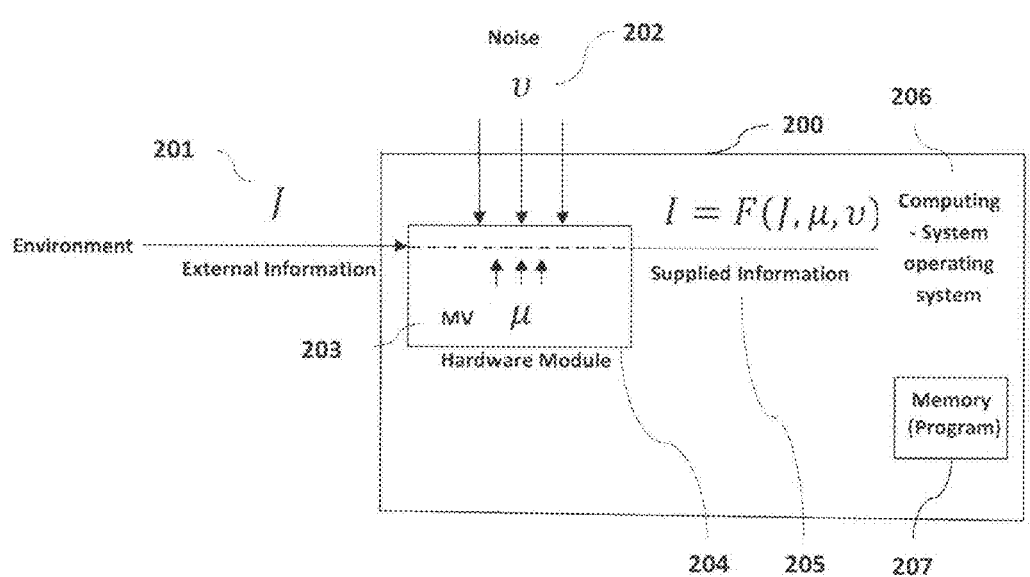
FIG. 2 shows a schematic diagram of the present system.

FIG. 2 shows the overall information flow from the hardware to the software in an embodiment of the present system. Within a computing system 200, the hardware module 204 gathers information 201 which can be internal to the hardware module itself. In this FIG. 2, the information 201 is shown outside the hardware module 204 for generality and clarity, and may include information such as light captured by a camera, or sound recorded by a microphone, interaction with a detection device such as a touch screen and the like. Alternatively, the information may be internal to the hardware module, such as data in a flash drive, or time of response for any hardware component, and the like. As the hardware module 204 gathers the external information 204, the readings of the hardware module typically are affected by noise (ν) 202 which can be caused by external sources, such as temperature, pressure, etc., or which can be internal to the hardware module itself, such as random noise caused by the circuit itself. The gathering of information by the hardware module 204 is affected by the manufacturing variability (MV) 203 in the hardware module 204. The supplied information 205 is a function of the combination of the external information, the noise, and the manufacturing variability. Finally, the operating-system 206 running on the computing system receives the supplied information.

The various hardware modules working inside a digital device can all be seen as channels which transfer external information J to the digital device. The delivered information is identified as I in FIG. 2. In this process, the environmental noise naturally occurring in any setting, together with the manufacturing variability (MV) of the module, affects the output signal being supplied to the computing system 200. The noise effects (ν) will be different at different times and for different chips. However, the noise can be characterized with a general probabilistic distribution which models the noise at different times and which will be the same for all chips (different instances of the same hardware module). The effects of the MV (labeled μ in FIG. 2) will generally be consistent and can be characterized using a general probabilistic distribution which models the effects of MV on different chips. This distribution can be time-variant. Because the computing system 200 is in use, it typically is assumed that the effects of noise and MV are relatively small and do not overshadow the information J being supplied by the hardware module 204. Due to the nature of MV, every chip will observe a different μ value. Therefore, if $μ_i$ can be extracted from the signal $I_i$ supplied to some digital device i, then the specific chip which was used to generate the information $I_i$ can be uniquely identified using $μ_i$ and therefore the device i can also be uniquely identified using $μ_i$. Since $I_i$ is accessible to the software running on the computing system 200, it should be possible to extract a unique identifier $μ_i$ for the computing system 200 which captures the hardware property using a software-only approach.

Due to that fact that the interaction between the external information J, the noise ν and the MV μ will be different for different hardware modules, the supplied information I is modeled as a function F of J, μ and ν. Thus:

$$I=F(J,μ,ν).$$

The present system and method is general to any situation where the hardware module 204 is being used to capture any information J. To capture μ, a value for J is selected such that it becomes easier to extract μ from the supplied information I. An extraction technique that may be used in the present system can generally be described as follows.

External information J is selected such that it maximizes the effects of μ and minimizes the effects of ν. The variable J can then be captured N times over different points of time to yield $I^j$ which is I captured at time j. In order to eliminate the effects of noise v, the N different signals $I^j$ are combined in a way that diminishes the effects of v. This combination process is captured using:

$$\hat{I}=C(I^1,\ldots,I^N)=G(J,\mu)$$

Where G is some function capturing the relation between the external information J, the MV μ and the new combined information $\hat{I}$. The next step is to eliminate the external information J. External information J is chosen to minimize the noise effects. A function then is derived to extract the unrelated information from $\hat{I}$ produce J. This function, labeled D, has the effect of freeing J from the unrelated information which was added to it. Therefore, utilizing the inverse of G, together with the output of D and the new combined information $\hat{I}$, μ is obtained. Thus:

$$\tilde{\mu}=G^{-1}(\hat{I},D(\hat{I})).$$

Where $G^{-1}(.)$ is the inverse of G and $\tilde{\mu}$ is the noisy version of μ, which is the fingerprint. With the extraction of $\tilde{\mu}$, various techniques, such as a fuzzy extractors (an example of which can be found in Yevgeniy Dodis, Rafail Ostrovsky, Leonid Reyzin, Adam Smith: *Fuzzy Extractors: How to Generate Strong Keys from Biometrics and Other Noisy Data*. SIAM J. Comput. 38(1): 97-139 (2008)), and the threshold scheme described herein, can be used to clean up the noise in $\tilde{\mu}$ to produce a noise-free unique identifier.

Figure 3:
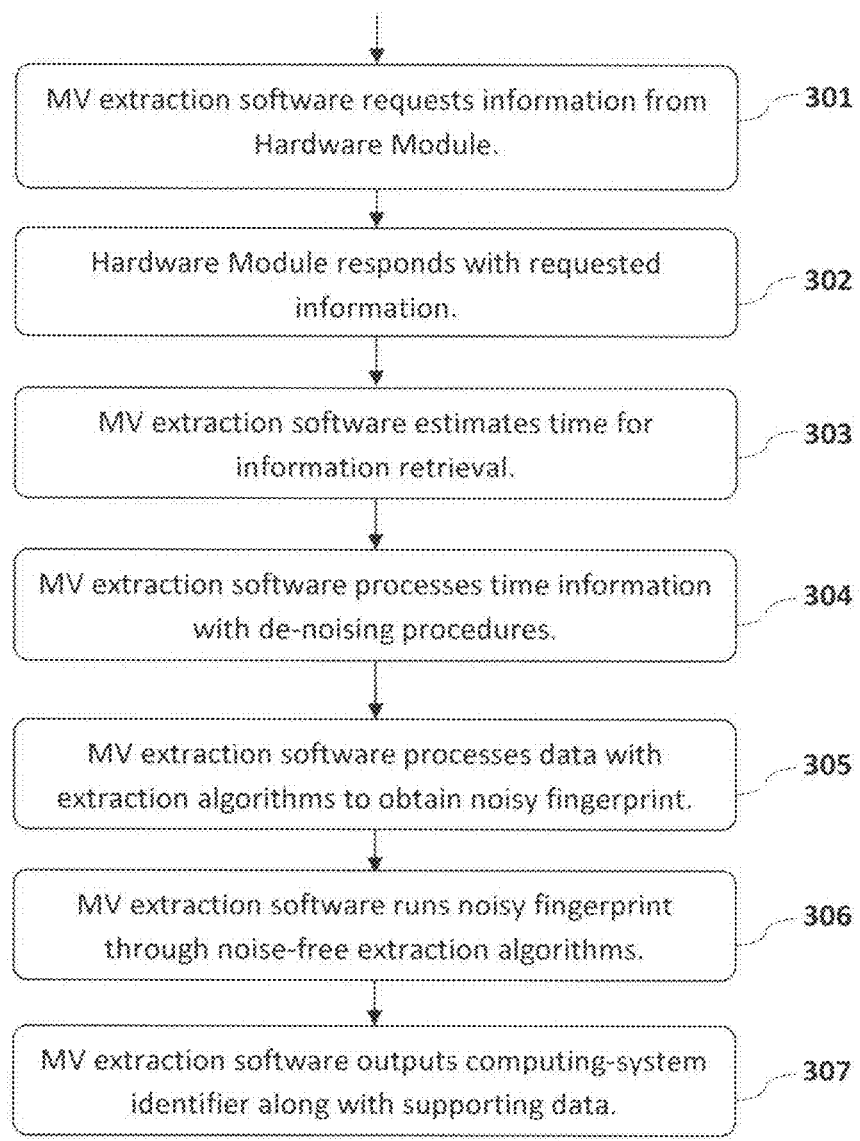
FIG. 3 is flow chart showing the flow of processing in an embodiment of the present method which utilizes timing estimates to extract information about the manufacturing variability MV.

FIG. 3 is flow chart showing the flow of processing the information received from the hardware module 204 in an embodiment which utilizes timing estimates to extract information about the manufacturing variability MV. Initially the MV extraction software requests information 301 from the hardware module. This FIG. 3 highlights the use of time to capture manufacturing variability through time delay. For example, the flash uses such a technique. When the OS does the requests the OS operation might introduce a delay which would partially shadow the time depending on MV. As in FIG. 1, this information can be anything which the hardware module is normally capable of providing (e.g., sound from a microphone, images from a camera, data from a memory, and the like.) The hardware module can then respond with the requested data 302. Once the data is received by the MV extraction software, the software makes time estimates 303 based on the time required to retrieve information for different types of data provided by the hardware module. MV extraction software can then process 304 the obtained data with de-noising procedures, such as known Fuzzy extractors. The MV extraction software can then process the data with extraction algorithms 305 to produce a noisy fingerprint of the computing system. The noisy fingerprint can then be processed by noise-free extraction algorithms 306 to produce a computing system identifier together with supporting data 307 which can aid the regeneration of the computing system identifier.

Figure 4:
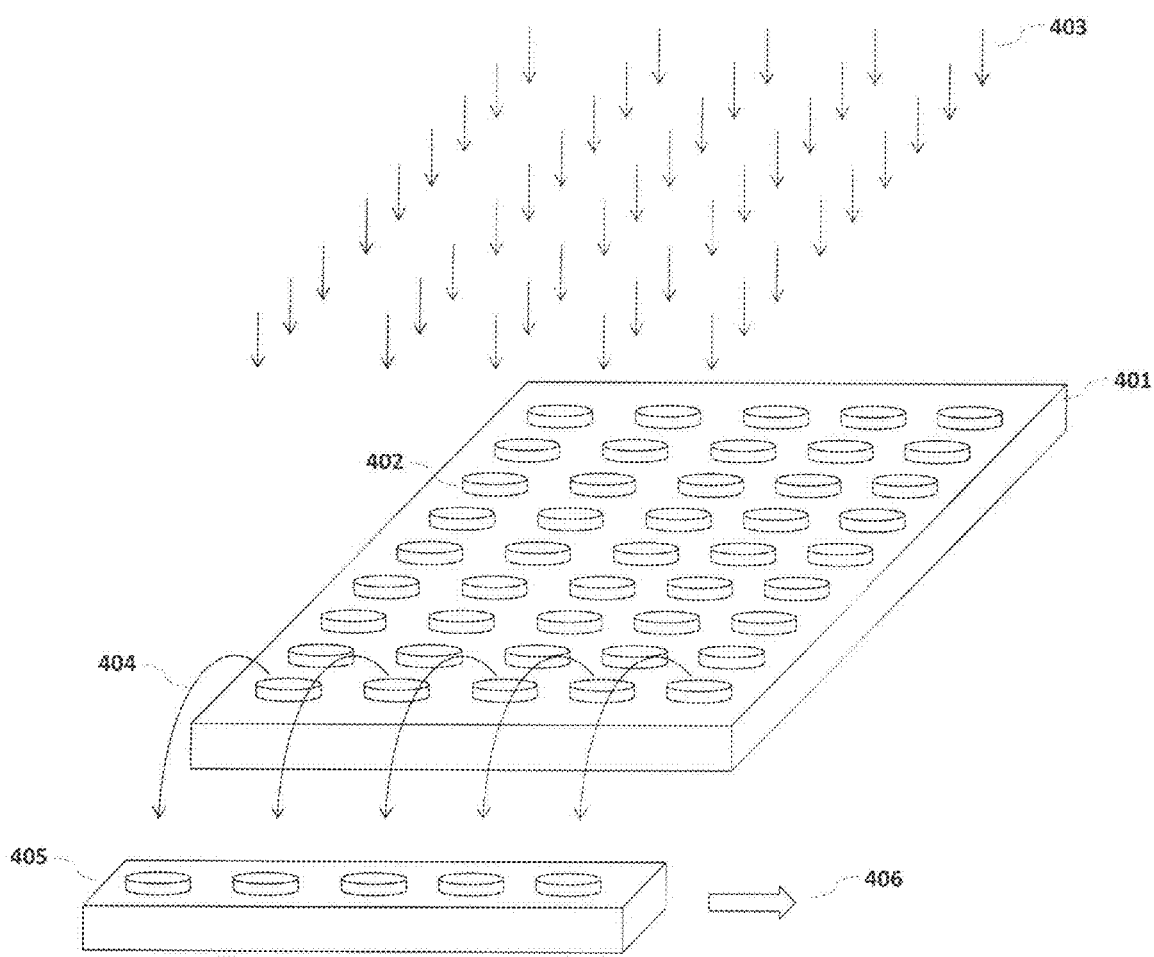
FIG. 4 is a simplified illustration of how digital cameras operate generally.

One embodiment of the present system and method uses a digital camera as a source of manufacturing variability. An example of a typical digital camera is shown in FIG. 4, which is a simplified illustration of how digital cameras operate. The figure shows an array of camera sensors 402 laid out in a 9×5 array. The array may differ depending on the nature of the specific camera. The sensors can all be fabricated on a single chip 401. When the incoming photons are reflected from any surface, the photons 403 are passed through to the camera sensors 402 which measure the intensity of the incoming photons. After the sensors have registered the intensity of the incoming photons 403, the readings at the last row of sensors are passed 404 to a register 405 which records the readings and outputs the readings data 406 to the camera's controller and driver (not shown), where the data can be collected and further processed. The readings of other rows of sensors then are passed along to the lower row of sensors, so that the row of sensors before last can be read the same way the last row was read. This process continues until all sensor readings are recorded. Note that the readings of the sensors can be shifted in any direction depending on where the output register is located.

The MV in a digital camera can be used to provide a computing system identifier through software. Digital cameras rely on very small sensors which basically convert light into an electrical signal proportional to the intensity of the incoming light. These sensors form the entire image and are mainly divided into two types, CCD (Charge Coupled Devices) and CMOS (Complimentary Metal-Oxide Semiconductor), collectively referred to as "camera sensors". The CCD sensors typically are used in higher resolution cameras and experience more power consumption, while CMOS sensors typically are easier to fabricate on a chip and experience a higher noise level with lower power consumption. Although each of these two types of sensors has different pros and cons, recent advances in the area of digital imaging is slowly bridging the gap between these two technologies making them almost interchangeable. The extraction technique of the present system works independently of the type of sensor used in the digital camera.

Ideally, each sensor corresponds to a pixel in the final image. However, camera sensors are color blind. They only measure the intensity of the incoming light rather than its frequency (color). In order to develop full color images, the digital camera captures the primary colors (red, green and blue). A number of techniques are used to develop such full color images. The most popular of these techniques is to apply a Bayer filter to the incoming light. This filter essentially assigns each camera sensor to one of the three primary colors by only allowing that color to pass to the corresponding sensor. More specifically, the Bayer filter assigns 50% of the sensors to the green color, 25% of the sensors to the red color, and 25% to the blue colors. The reading of the camera sensors are then passed through some analogue to digital converter and the final values are stored as the raw image. In order to produce full image resolution for each of the three primary colors, different de-mosaicing algorithms are used to interpolate each color pixel into the full pixel resolution. Most digital cameras (especially in low power devices) immediately convert the raw images into some compressed format, such as JPEG or TIFF, to save on the space needed to store the digital image.

As can be expected this is the case for digital cameras and, more precisely, for camera sensors. Although there is a large number of sensors in a digital camera, each one of these sensors is expected to have a slightly different behavior. Similarly, sensors found in two identical cameras will also observe slightly different behavior. More specifically, the difference in these camera sensors manifest itself as a small offset in the light intensity that it registers. Although these differences are extremely small it turns out that one can indeed detect and utilize these differences in a way which uniquely identifies the digital camera. What is quite remarkable about the variability found in these sensors is that even after the images undergo a number of image processing and compression steps it is still possible to extract and utilizes the variability. The present technique makes the collision probability (two devices producing the same fingerprint) exponentially small which is ideal for use in security applications.

There are a number of models which can be used to capture the manufacturing variability MV in the camera sensor. In one embodiment, the computing system is a digital camera having m by n resolution as an m by n matrix I. After taking an image, $I_{ij}$ which is the (i,j) element of the matrix I and will represent the intensity of the light captured by the (i. j) camera sensor. To distinguish between the three primary colors captured, variables $I^r$, $I^g$ and $I^b$ are used to denote the intensity matrix for red, green, and blue, respectively. As discussed above, digital cameras do not typically assign a sensor for every primary light at every pixel location. Typically, each primary color only is assigned to a number of pixel location, with the remainder being filled using some de-mosaicing algorithm. The manufacturing variability effect on the digital image is modeled as a multiplicative factor, which is independent in each of the different sensors for each of the three primary colors. Thus, assuming that J represents the ideal intensity matrix captured for any of the three primary colors using ideal sensors then the actual intensity can be represented by:

$$I_{ij} = J_{ij} + \mu_{ij} \cdot J_{ij}$$

Where $\mu_{ij}$ is the multiplicative factor capturing the manufacturing variability of the (i,j) sensor and will represent the camera fingerprint. In the present embodiment, the $\mu_{ij}$ factors are assumed to be independent for each sensor capturing one of the three primary colors. This is not the case when a Bayer filter is used, because the de-mosaicing algorithm will give rise to a pixel which is dependent on all of the adjacent pixels.

Another factor which should be taken into consideration before discussing how to extract a fingerprint is noise. The equation above assumes a noise-free process. To accommodate for noise, the noise variable $v_{ij}$ is introduced, which is assumed to affect each sensor independently and in an additive way. The measured intensity for pixel (i,j) and for one of the primary colors can be represented by:

$$I_{ij} = J_{ij} + \mu_{ij} \cdot J_{ij} + v_{ij}$$

A simplified form of this is:

$$I_{ij} = J_{ij} + (\mu_{ij} + \rho_{ij}) \cdot J_{ij} \quad (1)$$

where $\rho_{ij} = v_{ij} J_{ij}^{-1}$.

The key step which is typically used by those skilled in the art to retrieve the fingerprint is to apply a de-noising filter $D(\cdot)$. This filter basically removes the noise added to the image and returns the clean image. De-noising filter generally use the statistical properties of ideal images to remove any external effects such as the noise and the manufacturing variability. Several examples for de-noising filters can be found in the literature. In an embodiment of the present system, a filter is employed which utilizes wavelet transformations and which is fully described in Kivanc Mihcak, M.; Kozintsev, I.; Ramchandran, K., *Spatially Adaptive Statistical Modeling of Wavelet Image Coefficients and Its Application to Denoising*, Proceedings, IEEE International Conference on Acoustics, Speech, and Signal Processing, 1999, vol. 6.

An embodiment of the present system assumes that the output of the filter (i.e., the clean image) represents the ideal image J. Using the output of the filter, equation (1) can be rewritten as:

$$\frac{I_{ij} - D(I)_{ij}}{D(I)_{ij}} = \mu_{ij} + \eta_{ij} \quad (2)$$

assuming that $J_{ij} = D(I)_{ij}$. The above equation highlights other sources of noise, such as the denoising filter D which will not work perfectly. Another noise source is the compression performed on the digital image. Because most images produced by digital cameras undergo a compression process and are commonly stored in JPG format, this means that the value used for each pixel can only be an approximation of the actual sensor reading. These two sources of noise is highlighted because they each have a very different nature and distribution when compared to the environmental noise. To accommodate for these new noise sources, the following applies: $\rho_{ij} = \rho_{E_{ij}} + \rho_{D_{ij}}$ where $\rho_{E_{ij}}$ captures the noise coming from the environment, and while $\rho_{D_{ij}}$ captures the noise resulting from the filter imperfections and the compression process.

These noise sources represent the essential challenge in retrieving the digital camera fingerprint. In order to address this problem, averaging may be used over multiple images originating from the same digital camera. Note that all these images should have the same fingerprint $\mu_{ij}$. However, the noise $\rho_{ij}$ will be different for each of these images. On one hand, the environment noise $\rho_{E_{ij}}$ can be expected to follow the same probability distribution for each of the images, while on the other hand $\rho_{D_{ij}}$ will be different depending on the nature of the images used for averaging. For simplicity, it can be assumed that all images used in averaging are plane images of the same surface. This assumption means that the filter imperfections and the compression effects are almost constant for all the images used. Moreover, this assumption is quite realistic, because the user has full control over the type of images used. When this assumption about the nature of the images does not hold, the present system still applies with a mild reduction in the quality of the final fingerprint.

Next, the effects of the averaging procedure are analyzed. Superscripts indicate different images, while N represents the number of images used for averaging. Averaging over equation (2) for N images produces:

$$\frac{1}{N} \sum_{t=1}^{N} \frac{I_{ij}^t - D(I^t)_{ij}}{D(I^t)_{ij}} = \frac{1}{N} \sum_{t=1}^{N} \mu_{ij} + \eta_{ij}^t \quad (3)$$

$$= \mu_{ij} + \frac{1}{N} \sum_{t=1}^{N} \eta_{D_{ij}}^t + \frac{1}{N} \sum_{t=1}^{N} \eta_{E_{ij}}^t$$

When the images used are for similar surfaces, the term $$\alpha_{ij} = \frac{1}{N} \sum_{t=1}^{N} \eta_{D_{ij}}^t$$

will yield a constant which depends on the nature of the used images. The last term $$\beta_{ij} = \frac{1}{N} \sum_{t=1}^{N} \eta_{E_{ij}}^t$$

will essentially be an average over samples coming from a random variable. Assuming that $\rho_{E_{ij}}^t$ follows a Gaussian distribution, then the standard deviation of the random variable will scale with $$\frac{1}{\sqrt{N}}.$$

Thus, even for N=4 the noise level will drop by half. The outcome of Equation 3 can now be approximated by:

$$\mu_{ij} + \alpha_{ij} + \beta_{ij}$$

For a fingerprint to be useful it must be reproducible with a low noise rate, and must be different for different cameras. In the equation above, $\mu_{ij}$ will be the same even when two different batches of images are used as long as the digital camera is the same. At the same time, $\mu_{ij}$ is expected to be different for different camera. The third term, $\beta_{ij}$ will be different for different batches of images. However, the effect of $\beta_{ij}$ can be can be significantly reduced by increasing the number of images used N. It is worth noting that the term $\alpha_{ij}$ does not behave like $\beta_{ij}$. In fact, when this term has a large magnitude it will over shadow the fingerprint properties provided by $\mu_{ij}$ and therefore prevent the fingerprint from being useful.

At this point it seems that $\alpha_{ij}$ is the last roadblock in the path to obtaining a fingerprint from the digital camera. Keep in mind that $\alpha_{ij}$ is just an entry of an m by n matrix $\alpha$. To reduce the effect of $\alpha_{ij}$ we model its effect as an independent random variable which has the same distribution of each of the (i,j) locations. If $\mu_{ij}$ was fixed across the rows or columns, then averaging over the rows or columns would actually decrease the effect of $\alpha_{ij}$. However, recall that we have already assumed that $\mu_{ij}$ (the fingerprint) is sampled from some distribution and is independent for each of the mn pixels. This assumption means that averaging over the rows or columns would simply yield another random variable which still has a considerable level of noise.

Fortunately, the camera sensors are read through the last row of pixels. After the values of the last row are stored, the charge produced by all the upper rows is shifted down by a single row. Afterwards, the readings of the next to last row are stored. This process continues until all the sensor readings are stored. Again, due to imperfections in the hardware, the charge that passed from one row to another is not fully transferred and therefore creates significant dependencies between the row readings. This phenomenon would typically be undesired. However, for purposes of the present system, this behavior gives rise to the most important step of the present fingerprinting technique. Due to the dependencies between the rows the $\mu_{ij}$ values will not be independent throughout each column. This means that averaging over the rows decreases the effect of $\alpha_{ij}$ while giving rise to the effects of $\mu_{ij}$ which will be independent throughout the column. At this point, the present method can proceed by averaging over the rows of the processed image so far. With this step, the left side of Equation 3 becomes:

$$\frac{1}{mN} \sum_{i=1}^{m} \sum_{t=1}^{N} \frac{I_{ij}^t - D(I^t)_{ij}}{D(I^t)_{ij}} = x_{ij} \quad (4)$$

The equation above captures an embodiment of the fingerprinting technique of the present method and system. Variable $x_j$ is used to denote the fingerprint extracted from the $j^{th}$ column. The full fingerprint can be denoted as $X=[x_1 \ldots x_n] \in R^n$.

According to an embodiment of the present method and system, X will capture the extracted fingerprint of a digital camera regardless of the images used in the extraction process. Naturally this fingerprint will have some level of noise. However, when the N images used for extraction are plain images of the same surface, the $L_1$ distance between $X^1$ (X extracted from images of surface 1) and $X^2$ (X extracted from images of a different surface 2) will be small. The $L_1$ distance between two real vectors a, b$\in R^n$ is defined as $$d(a, b) = \sum_{i=1}^{n} |a_i - b_i|$$

where $a=[a_1 \ldots a_n]$ and $b=[b_1 \ldots b_n]$.

In a preferred embodiment of the present system and method, the distance between $X^1$ and $X^2$ needs to be small for any two surfaces. Moreover, when the extraction technique captured through Equation 2 is used to extract X, Y (each is a fingerprint for a different digital camera), the $L_1$ distance between X and Y will be large. The fingerprint extraction procedure is summarized in the FIG. 5.

Figure 5:
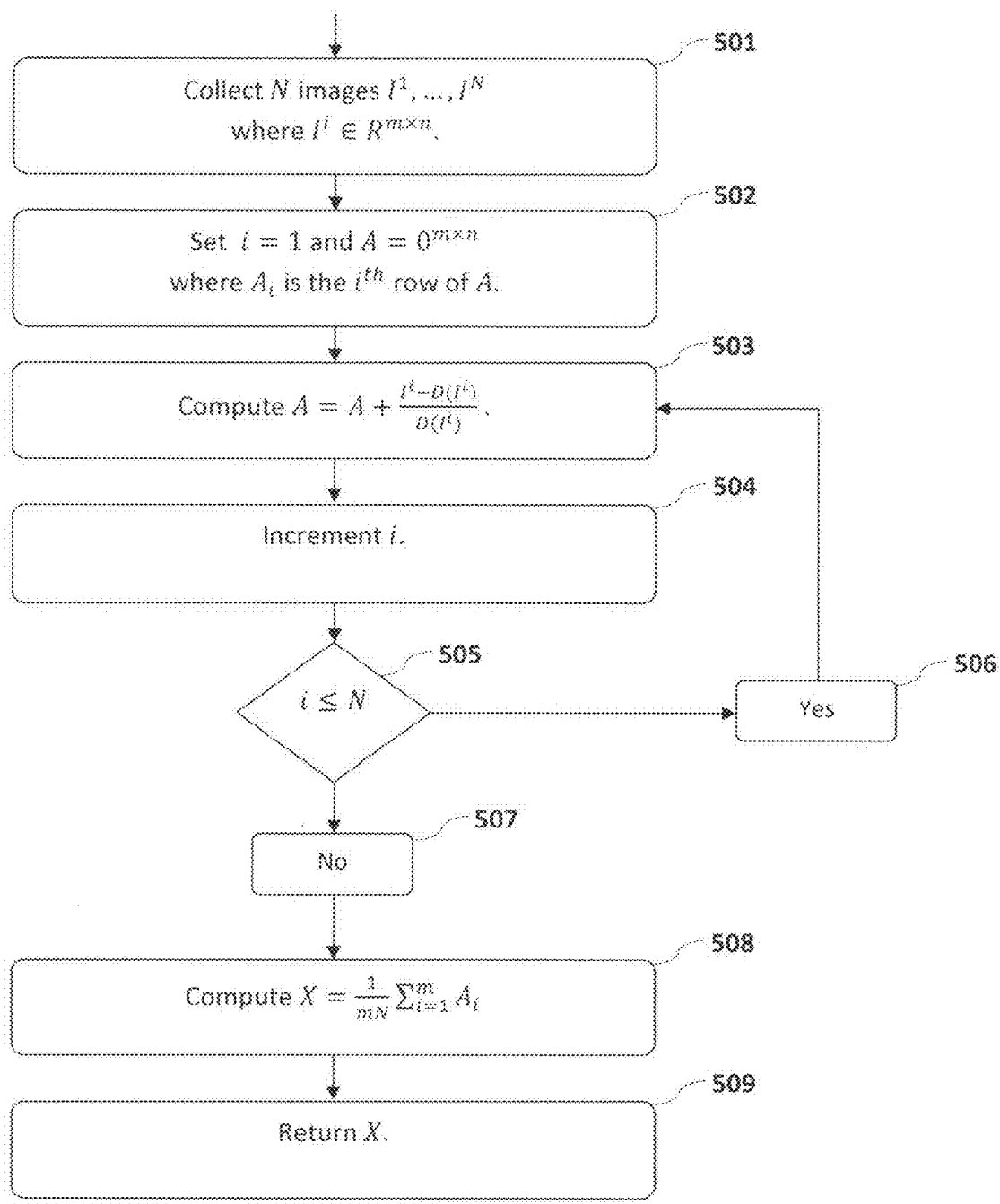
FIG. 5 outlines a flowchart for an embodiment of the present method for realizing software which can extract a fingerprint for a digital camera using N images.

FIG. 5 outlines a flowchart for an embodiment of the present method for realizing software which can extract a fingerprint for a digital camera using N images. Images are taken by camera and loaded to the software 501 where each image can be represented as an m×n matrix of real values $I^i$ where i=1 ... N. The software initiates a loop over all N images 502 with an initial m×n zero matrix A. In the $i^{th}$ iteration, the software computes 503

$$A = A + \frac{I^i - D(I^i)}{D(I^i)}$$

where D (.) is a de-noising filter and all operations are separately computed for each entry of the matrix. The software increments the index i 504. As long as the index is not greater 506 than the number of pictures 505, the software will repeat the step in 503. Once the index exceeds the number of pictures 507, the final fingerprint can be computed 508 as $$X = \frac{1}{mN} \sum_{i=1}^{m} A_i,$$

where $A_i$ is the $i^{th}$ row of A. Finally, the fingerprint X is returned by the software 509, and can then be processed for noise elimination and entropy extraction.

In the embodiment described above, X should really be labeled $X^r$, $X^g$ or $X^b$ where each fingerprint works with the red, green, or blue intensity matrix, respectively. Therefore, it is of importance to understand the relation between these different fingerprints. Ideally, these three fingerprints will be independent and thus will have a large $L_1$ distance between them. However, due to the usage of a Bayer filter, the red and blue fingerprints will have more internal dependency than the green fingerprint. In fact, due to the Bayer filter layout and the row averaging step described herein, only half of the entries of $X^r$ and $X^b$ will be independent while the other half will reconstructed from the independent entries. On the other hand, every entry $X^g$ will be independent. Therefore, the distance between $X^r$ and $X^b$ is roughly half of their distances to $X^g$.

In addition, X can be reliably extracted with some noise. However, to use X in any cryptographic application, it needs to have a zero level of noise. This problem typically is faced when trying to use biometrics to identify human. As a solution for this problem, fuzzy extractors, such as that described in the Dodis et al. reference, cited above, are used. A fuzzy extractor is a technique to extract an almost uniform random string from a given input, such that it is possible to reproduce the same output string from a noisy version of the input. In the Hammouri et al. reference, cited above, a fuzzy extractor is demonstrated using an error correcting code, along with a universal hashing function.

In an embodiment of the present system and method, a variant of the prior art techniques, as outlined in the Hammouri et al. reference, is used. In this embodiment, the threshold technique works over the reals rather than binary information. Therefore, the preferred technique is capable of naturally working with a camera fingerprint. The threshold technique can be used when there is sufficient entropy in the raw fingerprint and when the noise level is acceptable. If these conditions do not exist, then the fingerprint may not be sufficiently secure.

In practicing an embodiment of the present system, digital images are obtained from digital cameras found in cellular phones. For each type of cellular phone, data is collected from a number of different surfaces, each of which is used to compute a fingerprint. The same step is repeated for a number of identical and different cellular phones. Finally, the threshold distance between these various fingerprints is computed. Preferably, the fingerprint has a small distance when it is extracted from images of different surfaces using the same camera, i.e., low noise. Moreover, the fingerprints should have a large distance when extracted from the same surface using two different cameras, i.e., large distance. Getting a large distance between fingerprints extracted from different cameras which have different brands seems relatively easy. The real challenge is faced when identical cameras and cellular phones are used.

In practicing the present system and method, it is estimated that from a 1 Megapixel camera, more than 500 bits of entropy can be extracted. This is a massive number of bits obtained directly from the device, especially when taking into consideration that such number is adjusted to error correction in order to produce a noise-free identifier. In this embodiment, the extraction, noise elimination, de-noising, filtering, averaging and error correction all steps of the present method are performed on computing systems which contain a digital camera, and were implemented using software.

Figure 6:
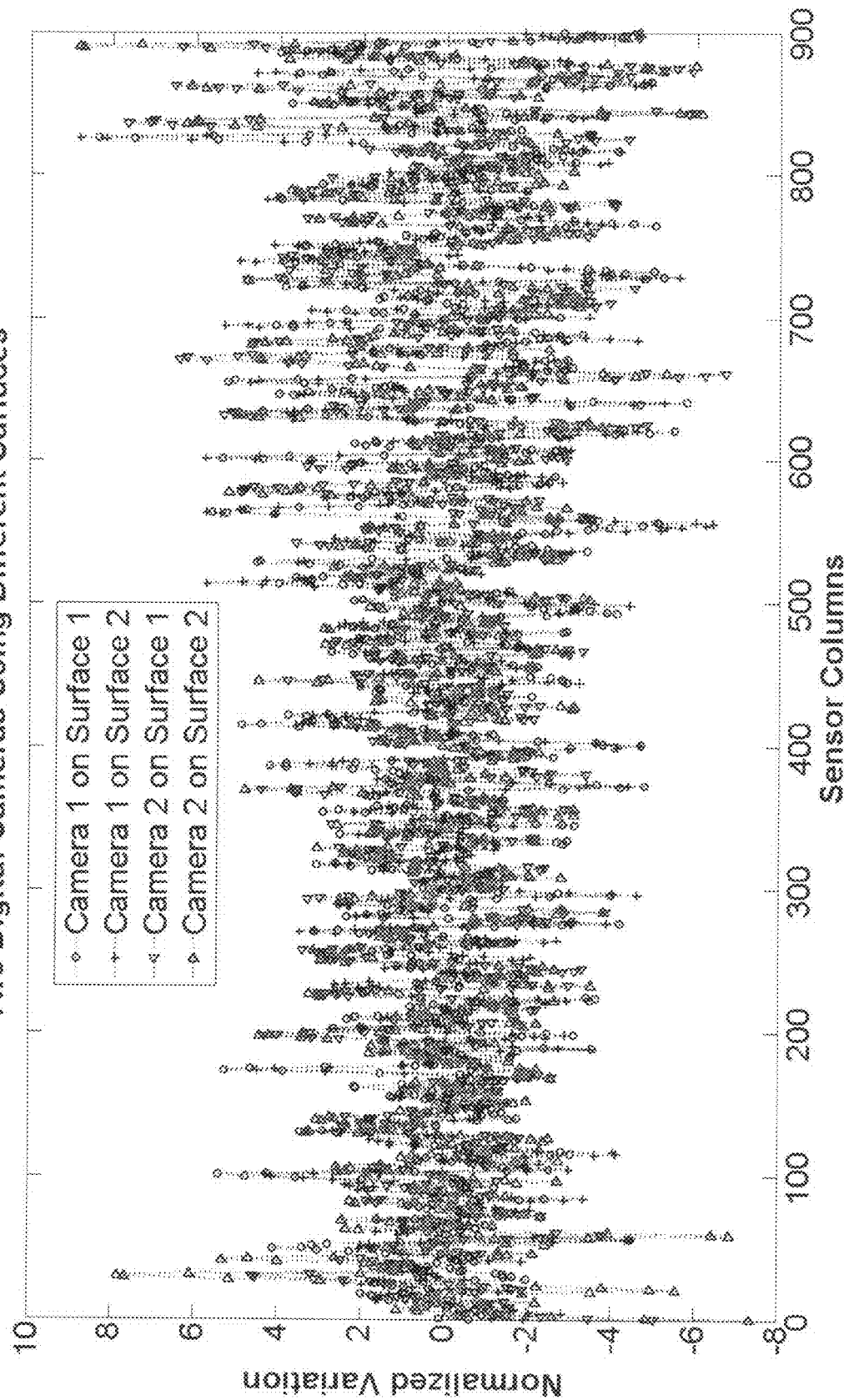
FIG. 6 shows two fingerprints extracted using the embodiment of the present system, as outlined in FIG. 5.

FIG. 6 shows, as an example, two fingerprints extracted using the embodiment of the present system outlined in FIG. 5. The four traces were taken from processing a number of images of two different surfaces obtained from two identical digital cameras. Each camera was used to obtain a number of images from two different surfaces. Then the pictures were processed through the steps outlines in FIG. 5. The x-axis indicates the number of the column, and the y-axis indicates the normalized variation in the extracted fingerprint. The figure shows 900 columns extracted from the two cameras. FIG. 6 shows that the first two traces which are associated with the first camera, and which are representative of images for two completely different surfaces, are very close and similar. On the other hand, the third and fourth traces, which are associated with the second camera, are close and similar to each other while being different from the first two traces. This is the behavior expected from a fingerprint.

Figure 7:
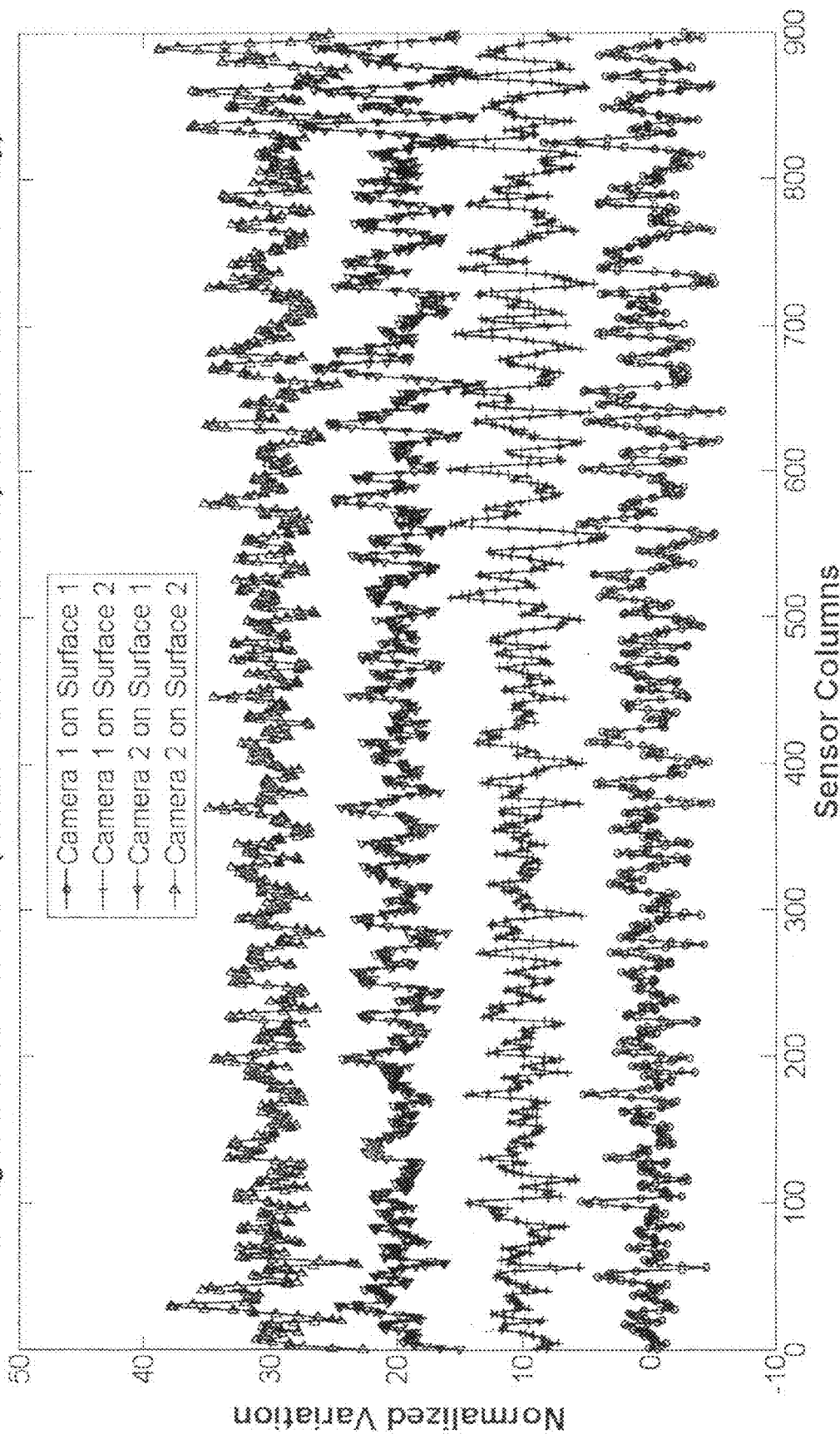
FIG. 7 is an elaboration on the fingerprint extractions shown in FIG. 6.

FIG. 7 is an elaboration of the fingerprints shown in FIG. 6. The same traces plotted in FIG. 6 are repeated; however, in this illustrated example, an artificial shift was introduced to traces 2, 3, and 4 to visualize the similarities between traces 1 and 2 and between traces 3 and 4. It also illustrates the differences between the two sets of traces. A quick glance at FIG. 7 immediately shows that the lower two traces are very similar. Similarly, the top two traces are very similar, while being quite different from the bottom two traces.

FIG. 8 is a table of noise level and distance, given when N images are used in the extraction process of a fingerprint for a typical digital camera. The table shows the results after using a known threshold technique (see, Ghaith Hammouri, Aykutlu Dana, Berk Sunar: *CDs Have Fingerprints Too*. CHES 2009: 348-362) for a threshold value of 2. The noise level clearly decreases when more images are used. The final identifier can easily be noise-free after error correction techniques are used, such as Parity codes, BCH codes, Reed-Solomon, Hamming codes, and others generally known to those in the art. Moreover, the distance shown is around half which is an indication of a high level of entropy.

FIG. 9 shows a table for noise level and distance, given when N images are used in the extraction process of a fingerprint. The table shows the results after using the same threshold technique used for generating the data for the table in FIG. 8, for a threshold value of 4. With a high threshold value, the extraction algorithm becomes more greedy, which results in very quickly and effectively reducing noise (5 images would suffice, but may be more). However, this improvement comes at the expense of the distance between the fingerprints extracted, which effectively translates into less entropy extraction.

In one embodiment of the present system and method, a microphone is used as the source of manufacturing variability. The MV in the microphone is used to provide a computing system identifier through software. A microphone has the basic function of capturing audio and supplying it in an analogue format so that it can finally be stored in a digital format that closely captures the original audio signal. The recorded sound typically undergoes environmental noise which could be modeled using Gaussian random variables. Due to the simple nature of environmental noise, straight forward techniques, such as averaging, can be used to reduce the noise effects. Even though there exist several methods for a microphone to convert sound into the final analogue signal (examples include dynamic microphones, condenser microphones, ribbon microphones, crystal microphones, etc.), the analogue signal supplied by the microphone will always be affected by the MV found in the microphone. These MV effects manifest themselves as variations in the amplitude and frequency of the supplied electrical signal.

An embodiment of the present system includes software which extracts the effects of MV from the supplied signal. One way to achieve such extraction is by using a template controlled input technique. Such a technique works by feeding the microphone with a pre-computed sound template. The sound template can be prepared in several ways. One method of preparing such a template is performed as follows. A random (low noise, frequency calibrated) sound clip is captured using several microphones. The captured signal then is noise-reduced and averaged over several devices to flatten the effects of MV. The output of the averaging technique then is used as a template to estimate an MV-controlled signal. Using the sound template, it becomes easy to isolate the effects of MV in one specific device from the noise and the captured signal. Once these effects are extracted, they can be easily coupled with the noise-free extraction techniques. Examples of known techniques include those described in the Dodis, et al. article, and the Hammouri et al. article, both of which are cited above.

In another embodiment of the present system and method, flash memory is used as a source of manufacturing variability.

Figure 10:
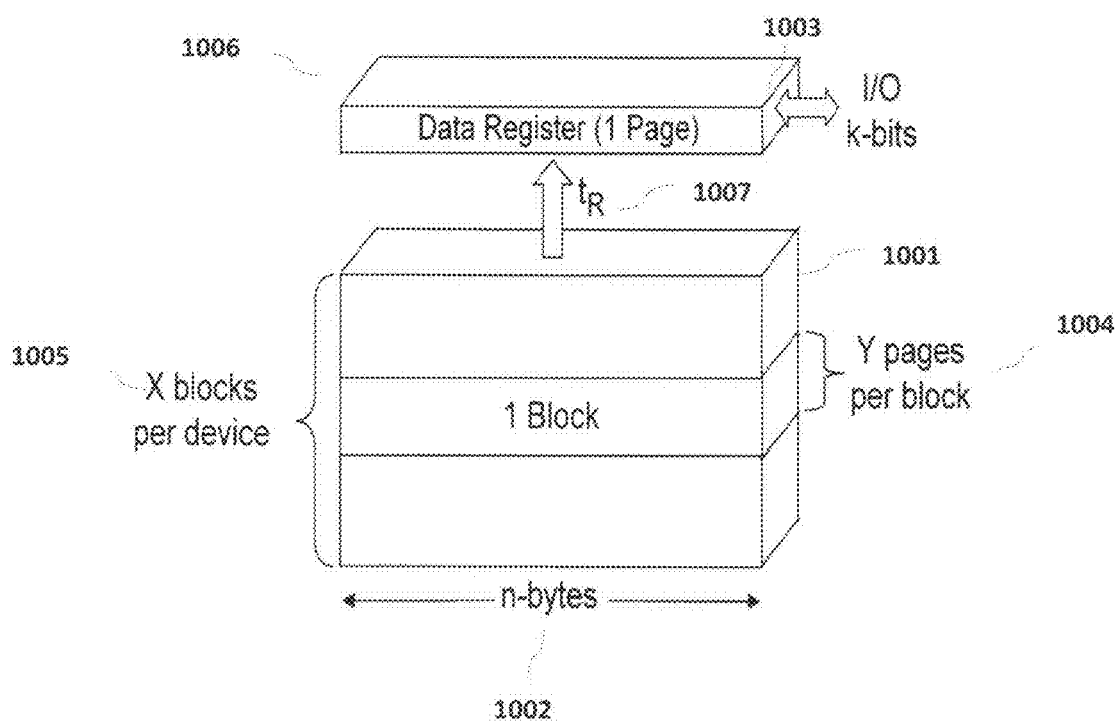
FIG. 10 illustrates a general structure for flash memory.

The MV in the flash memory can be used to provide a computing system identifier through software. Over the last decade, flash memory technology has become one of the most common storage methods. It is used in various devices, such as memory cards, USB drives, cellular phones, etc. Flash memory architecture mainly consists of memory cells, pages, and blocks. FIG. 10 illustrates a general structure for flash memory. Each page 1001 has k of n-byte arrays 1002, where k is the size of the I/O bus 1003. Usually, the I/O bus of a flash memory chip is 8 or 16-bits. Y pages are stacked together 1004 to generate a block, and the whole device consists of X of these blocks 1005. The data in the target page is transferred to the data register 1006 which has the same size of a page through the bit lines 1007.

Figure 11:
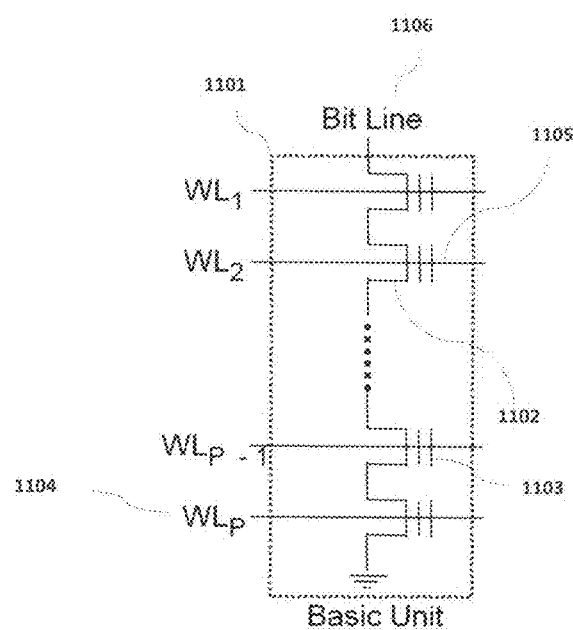
FIG. 11 illustrates an example of vertical dimension of NAND-based flash devices.

In the vertical dimension, each block consists of many (varies as a function of n and k) basic memory strings, an example of which is shown in FIG. 11 for NAND based flash devices. FIG. 11 illustrates an example of a vertical dimension of NAND based flash devices. Each block of memory consists of many (varies as a function of n and k) basic memory strings 1101. Each string has p memory cells 1102 which are implemented using floating gate transistors 1103. Each of the word lines ($WL_p$) 1104 belongs to a different page in the block. Word lines 1105 are used to select a specific row in the hierarchy of a block. Similarly, bit lines 1106 are used to select a specific column in the page. Bit lines also are used as I/O ports while reading/writing data.

Reading data from flash memory typically is implemented on a page basis. From a high-level perspective, the controller fills the command register with the read command value and provides the specific address for the page to be read. Using the address, the device selects a specific block, and then it selects a specific row (page) in that block. Page selection in the block is achieved using the word lines. Using this method, all the data (cellular) values in the target page are transferred to the data register which has the same size of a page. Keep in mind that the bit lines are utilized for this transfer. While the data is being transferred from the memory array to the data register, flash chips typically pull a status signal low (logic zero) indicating that it is busy reading data. Once the data transfer is complete, this signal is asserted back to logic one, meaning that the data transfer is complete and the data register is filled with the required page's data. After observing a data ready signal, the controller reads the data out in a serial manner through the I/O channel using a read enable signal as a clock.

The amount of time it takes to transfer data from memory array to data register can be represented using the variable $t_R$. Note that the value of $t_R$ is not a constant for all locations on a flash chip and will therefore vary from one location to another. Typically, the value of $t_R$ is reported as a variable by the chip manufacturers and is only restricted by a maximum limit which the chip should not exceed.

As the flash memory structure demonstrates, the reading of different pages will result in different time delays depending on the path taken by the data after reading. This path will not be perfect and will therefore vary for different chips which were intended to be identical. This variation is captured by the variable $t_R$. Note that this value is determined essentially by how fast the cellular data value in a memory string is carried through the string of devices leading to the data register. Among many variables this time delay will be a function of the capacitive/resistive properties of the metal path. Due to imperfections of manufacturing process, these properties will be slightly different even though the chip layouts are identical. Hence, the value of $t_R$ will be slightly different while reading the exact same data from the exact same locations of two identical flash chips.

The variability on $t_R$ is not a revelation to any expert on chip manufacturing. What is innovative about applying this method to flash memory is the ability to extract the variation in the $t_R$ signal using a software-only approach. Without any change or addition to an existing device this method allows the extraction of a unique identifier which depends on the manufacturing variability.

The present method and system uses the device driver that communicates with the flash memory chip. The driver that controls the communication between the processor and the flash memory is located inside the kernel software. The driver is used by the operating system to regulate communication with the flash device. The driver essentially listens and reads the status signal coming from the flash chip. Moreover, the driver drives the control signals to implement a specific task on the flash chip such as program, erase, read, reset, etc.

With this low-level interface, the driver can essentially get clear access to the signal representing the time delay $t_R$. Consequently, the present system takes control over the driver and utilizes the processor of the computing system hosting the flash device in order to estimate the value $t_R$. The rising and falling edge of the status signal can be accurately timed by only using software commands run directly on the processor. Once the edges are detected, the exact time required to transfer the data from the memory array to the data register for a specific page in the flash can be computed. Of course this value will include some measurement noise.

As discussed above, this measurement noise can be reduced using repeated reads from the same page and by taking the average of all these measurements. Using several pages, a large array of timing values can be formed and used as fingerprint of the underlying flash chip. Using several pages will essentially increase the amount of entropy extracted from the flash chip. Once the fingerprint is stored by the software, the data can be normalized to remove constant offsets. With this signal, known noise-free extraction techniques, as cited above, can be applied to extract a noise-free identifier of the computing system.

Note that the resolution of time estimates is limited by the clock frequency of the processor. Given that the delay variable $t_R$ has typical values in the micro second range any standard processor will be able to provide very accurate timing. For example, for a 600 MHz processor, delay variations of less than 1.6 nanoseconds can be measured. Thus, even a variation which is less than $1/1000$ of $t_R$ can easily be estimated.

FIG. 12 is a graph of a fingerprint extracted from two exemplary flash devices. The four traces in FIG. 12 were taken from processing a number of reads at two different times obtained from two identical flash devices. Each flash was timed to see the time required to obtain information from a number of memory locations in the flash drive. The four traces have a horizontal offset artificially introduced on three of the four traces in order to show the similarities in the four traces. The lower two traces are obtained from one flash drive at two different times. The top two traces are obtained using a different flash drive at two different times.

The present method and system has numerous embodiments. One general embodiment of the technique is for a hardware module. By timing the hardware module response time, the present system can extract an identifier of the hardware module and therefore of the entire computing system. In such case, the inverse operation would not be necessary as time would be directly dependent on MV.

In another embodiment, touch screen is used as a source of manufacturing variability. The MV in a touch screen can be used to provide a computing system identifier using the present system and method. The touch screen mainly captures user input and enables the interaction of the user with the device through specific finger/stylus gestures.

In general, touch screen technology is based on a grid of sensors located at the surface of the screen. Each of these sensors is capable of sensing the contact of a finger/stylus. These sensors can be built using different techniques depending on the system. For instance, capacitive/resistive touch sensors use electrical current for detecting contacts at the surface. More specifically, contacting one of these sensors changes its current state (resistance or capacitance) and causes a change in the current associated with that sensor. Essentially, this change in the current is measured and used to determine the specific contact at the touched location.

Next, using the coordinate system like a grid structure, raw data associated with the whole screen is recorded and sent to the microprocessor for processing. The recorded information typically undergoes environmental noise which may be modeled using different statistical models. Therefore, simple noise can directly be eliminated using several reads from the touch screen module. The touch screen uses different algorithms to measure pressure points. This process essentially decides exactly which coordinates on the screen are touched.

Even though touch screen systems use various methods (e.g., electrical current, sound waves, near-infrared light, vibration, etc.) for sensing the finger/stylus contact, the measured coordinate information supplied by the touch screen will always undergo the effects of MV found in the various screen sensors. These MV effects manifest themselves as variations in the raw grid data received by the processor. Therefore, the MV effect on the raw data can be modeled as a multiplicative factor (as is the case in with the digital camera) or as an additive variable, directly shifting the voltage levels of the raw data.

By having the data received on the software side, it becomes direct to apply a de-noising filter to capture the MV grid. The MV values can then be processed to produce a noisy fingerprint of the underlying hardware module. Finally, noise-free extraction techniques (examples include schemes presented in Yevgeniy Dodis, Rafail Ostrovsky, Leonid Reyzin, Adam Smith *Fuzzy Extractors: How to Generate Strong Keys from Biometrics and Other Noisy Data*. SIAM J. Comput. 38(1): 97-139 (2008), and Ghaith Hammouri, Aykutlu Dana, Berk Sunar: *CDs Have Fingerprints Too*. CHES 2009: 348-362)) can be applied to produce an identifier for the system.

In yet another embodiment, several hardware modules are used as a source of manufacturing variability.

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a give system according to the present system and method. Accordingly, all combinations of the disclosed features and methods fall within the scope of this disclosure.

Although this system and method has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A kit for generating an identifier for a computing system, comprising,
   A. a computing system having at least one component having a manufacturing variation relative to like-manufactured components and including a processor and an operating system resident thereon, the component converting external information into data influenced by the manufacturing variation; and
   B. a non-transitory machine-readable medium having collectively stored thereon executable instructions adapted to be run by the operating system on the computing system, wherein the instructions when executed by the computing system process the data to reduce noise, generate fingerprint data of the manufacturing variation of the at least one component from the processed data, process the digital identifier value to generate redundancy information therefrom, generate an identity string from the digital identifier value and the redundancy information, wherein the identity string is representative of the identity of the computing system, and derive a digital identifier value from the fingerprint data, the digital identifier value being derived at least in part from and substantially representative of the manufacturing variation.

2. A kit according to claim 1 wherein the computing system is one from the group consisting of:
   i. a computer, including at least one integrated circuit, wherein the integrated circuit is the at least one component,
   ii. a telephone, including at least one integrated circuit, wherein the integrated circuit is the at least one component,
   iii. a camera, including at least one integrated circuit, wherein the integrated circuit is the at least one component,
   iv. a camera and an associated image sensor, wherein the image sensor is the at least one component,
   v. an audio device and an associated microphone, wherein the microphone is the at least one component,
   vi. an audio device of a computer and an associated microphone, wherein the microphone is the at least one component,
   vii. a computer and an associated display, wherein the display is the at least one component,
   viii. a computer and an associated internal memory, wherein the memory is the at least one component, and
   ix. a computer and an associated external flash memory, wherein the flash memory is the at least one component.

3. A kit according to claim 1 wherein the computing system includes a computer and an associated memory, wherein the memory is the at least one component, and wherein the digital identifier value is derived at least in part manufacturing variation-based variations of a measured stored information retrieval time associated with the memory.

4. A kit according to claim 3 wherein the coupler is selectively operable to obtain the instructions by way of the internet, for loading onto the computing system.

5. A kit according to claim 1 further comprising a coupler for selectively loading the instructions onto the computing system.

6. A kit according to claim 1 wherein the identity string is a privacy amplified version of digital identity value.

7. A kit according to claim 1 wherein the generation of the digital identifier value is pursuant to at least one noise reduction step.

8. A kit according to claim 1 wherein the generation of the digital identifier value is pursuant to at least one de-noising filtering step.

9. A kit according to claim 1 wherein the generation of the digital identifier value is pursuant to at least one post processing step.

10. A kit according to claim 1 wherein the redundancy information is a result of an error checking and correction method.

11. A kit according to claim 1 wherein the generation of the identity string is pursuant to at least one fuzzy extraction processing step.

12. One or more non-transitory machine-readable media having collectively thereon executable instructions that, when executed by one or more processors of a computer system, cause the computer system to at least:
generate a digital identifier value based at least in part on data captured by at least one component from external information, the data influenced by a manufacturing variation of the at least one component of the computing system relative to like-manufactured components, the digital identifier value being derived at least in part from the manufacturing variation;
process the digital identifier value to generate redundancy information therefrom; and
generate an identity string from the digital identifier value and the redundancy information, wherein the identity string is representative of the identity of the computing system.

13. The non-transitory computer-readable storage media of claim 12, wherein the generation of the digital identifier value is pursuant to at least one noise reduction step.

14. The non-transitory computer-readable storage media of claim 12, wherein the generation of the digital identifier value is pursuant to at least one de-noising filtering step.

15. The non-transitory computer-readable storage media of claim 12, wherein the digital identifier is consistent across a plurality of data captured by the at least one component.

16. The non-transitory computer-readable storage media of claim 12, wherein the generation of the redundancy information is pursuant to an error checking and correction method.

17. The non-transitory computer-readable storage media of claim 12, wherein the generation of the identity string is pursuant to at least one fuzzy extraction processing step.

18. The non-transitory computer-readable storage media of claim 12, wherein the identity string is a privacy amplified version of digital identity value.

19. A computer-implemented method for identifying a computing system by manufacturing variation, comprising:
under the control of one or more computer systems configured with executable instructions,
receiving image data captured by a hardware module;
processing the image data to reduce noise;
extracting an identifier value from the processed imaged data derived at least in part from a manufacturing variation of a component in the hardware module, the identifier value correlating to at least a plurality of image data captured by the hardware module;
processing the identifier value to generate redundancy information therefrom; and
generating an identity string from the identifier value and the redundancy information, wherein the identity string is representative of the identity of the computing system.

20. A method according to claim 19, wherein receiving image data further includes receiving an image file representing the image.

21. A method according to claim 19, wherein the step of generating the identifier value includes at least one de-noising filtering substep.

22. A method according to claim 19, wherein the step of generating the identifier value includes at least one post-processing substep.

23. A method according to claim 19, wherein the step of generating the redundancy information includes at least one error checking and correction substep.

24. A method according to claim 19, wherein the step of generating the identity string includes at least one fuzzy extraction processing substep.

25. A method according to claim 19, wherein the step of generating the identity string includes at least one privacy amplifying substep.

* * * * *